Dec. 11, 1951     E. W. OLIVA     2,577,910
PIVOTALLY MOUNTED TIRE BEAD COMPRESSING CLAMP
Filed Aug. 26, 1948     2 SHEETS—SHEET 1
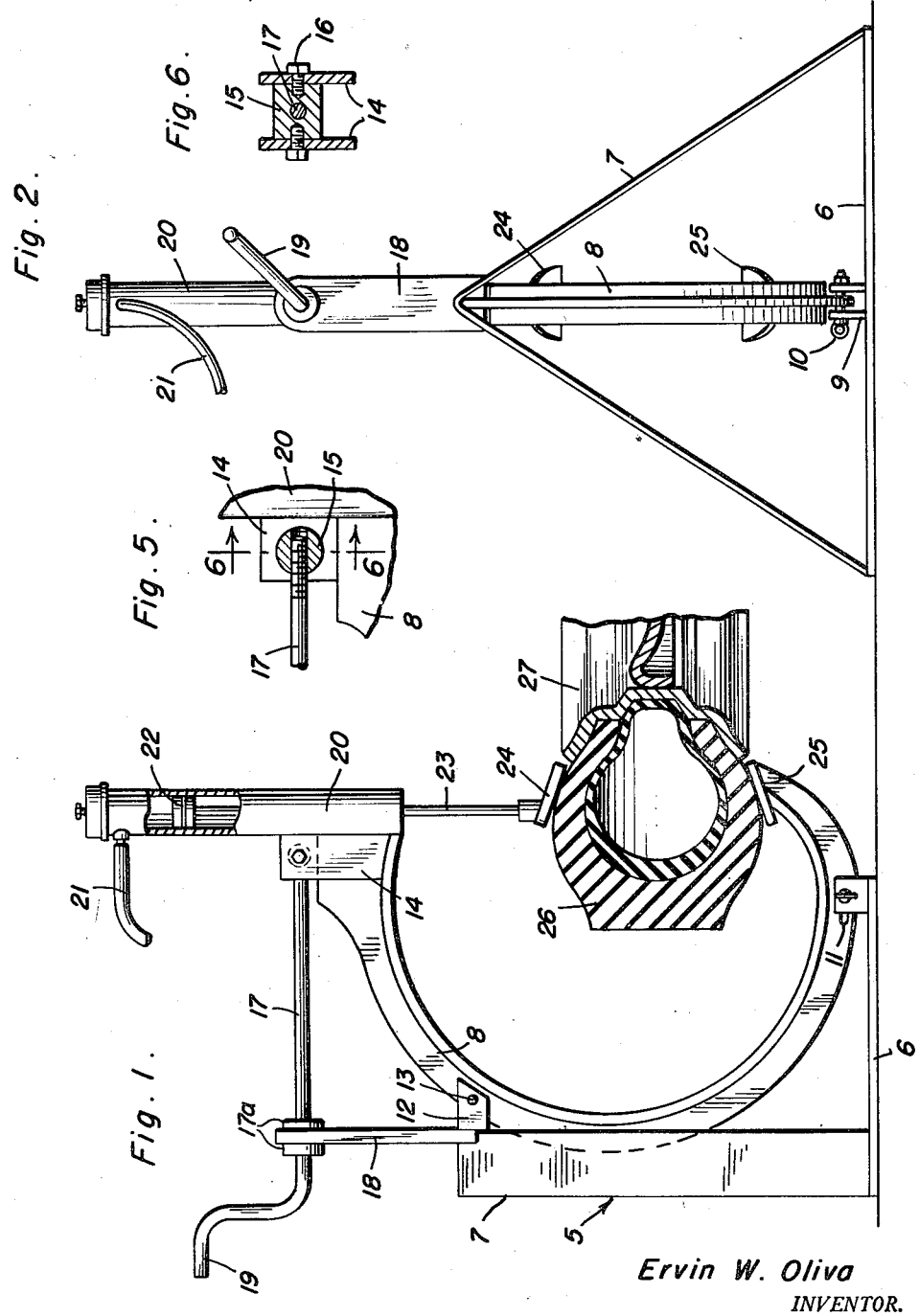
Ervin W. Oliva
INVENTOR.

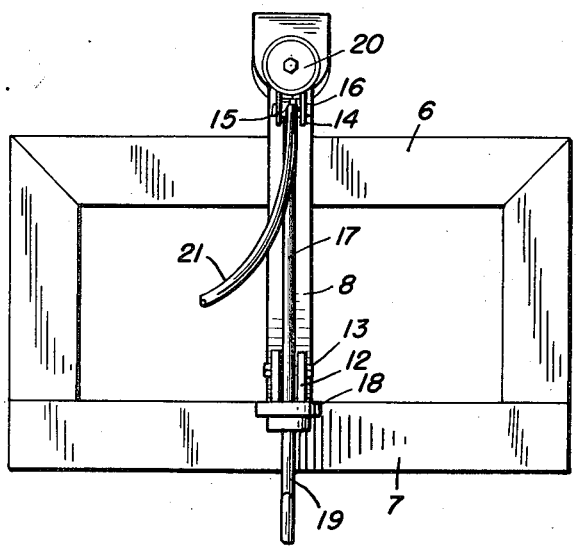
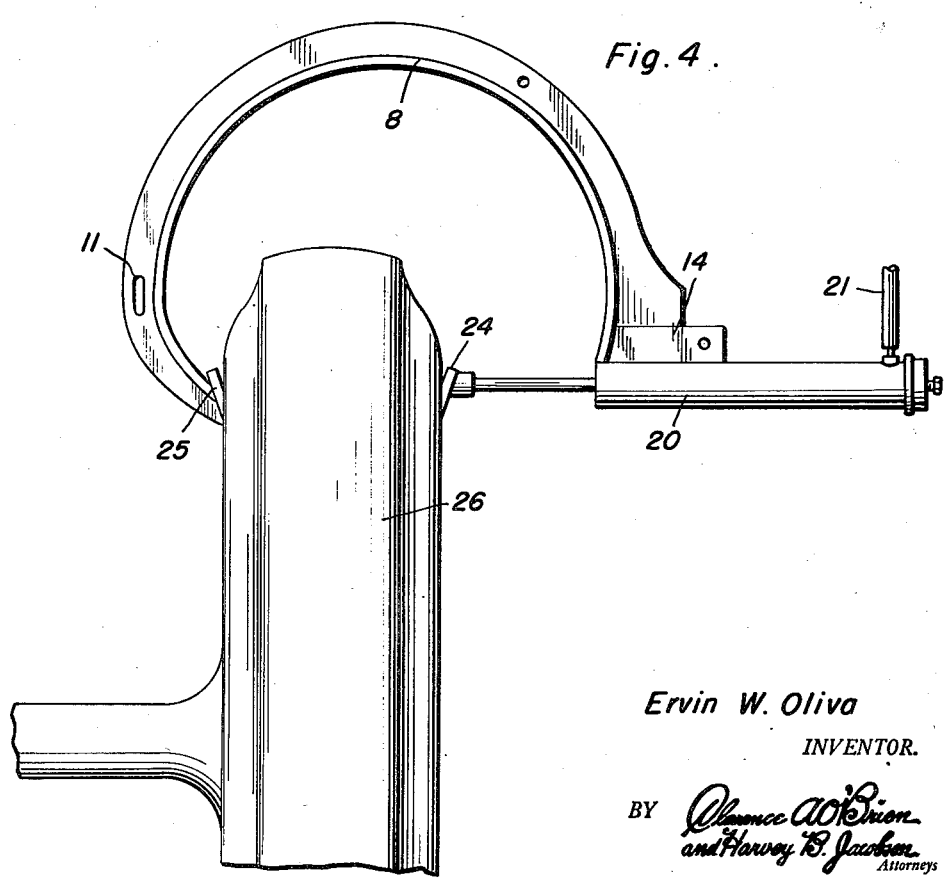

Patented Dec. 11, 1951

2,577,910

UNITED STATES PATENT OFFICE 2,577,910

PIVOTALLY MOUNTED TIRE BEAD COMPRESSING CLAMP

Ervin W. Oliva, Alton, Kans.

Application August 26, 1948, Serial No. 46,318

1 Claim. (Cl. 157—1.28)

The present invention relates to new and useful improvements in tire changers and more particularly to an apparatus of this character for breaking loose or freeing a tire casing from a drop center rim to facilitate removal of the tire from the rim.

An important object of the invention is to provide a tire changer embodying the use of fluid pressure means to compress the side walls of a tire casing and thus break the same loose from a wheel rim.

A further object of the invention is to provide an apparatus of this character which may be used in the removal of a tire casing from a rim of a wheel removed from a vehicle, or for removing the tire without necessitating removal of the wheel from the vehicle.

A still further object is to provide a device of this character of simple and practical construction, which is strong and durable, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the tire changer supported on a stand in a position for removing the tire from a rim after the latter has been removed from a vehicle;

Figure 2 is a rear elevational view;

Figure 3 is a top plan view;

Figure 4 is a side elevational view showing the tire changer removed from the stand for use in removing a tire from a wheel while mounted on a vehicle;

Figure 5 is an enlarged fragmentary sectional view of the swivel connection for adjusting the clamp in the stand; and Figure 6 is a sectional view taken on a line 6—6 of Figure 5.

Referring now to the drawings in detail wherein for the purpose of illustration I have disclosed a preferred embodiment of the invention, the numeral 5 designates a stand which includes a substantially rectangular shaped base 6 from the rear corners of which rise an inverted V-shaped upright 7.

A C-type clamp 8 is supported in an upright position on the stand 5 by means of a pair of upstanding spaced parallel ears 9 suitably secured to the front edge of the base 6 of the stand and provided with a bolt and nut 10 received in an arcuate slot 11 in the lower portion of the clamp. The upper portion of the clamp is positioned between a pair of spaced parallel apertured lugs 12 suitably secured to the upper portion of the upright 7 and provided with a transverse pin 13 on which the upper portion of the clamp is pivotally attached.

A pair of spaced apart plates 14 are suitably secured to the upper end of clamp 8 and project upwardly therefrom and between which is rockably supported a swivel block 15 by means of screws or pins 16 carried at the upper ends of plates 14.

An adjusting screw 17 is journaled in the upper end of an upstanding bracket 18 suitably secured to the upper portion of upright 7 and the screw is held against longitudinal movement by washers 17a fixed to the screw. The inner end of the adjusting screw is threaded into the block 15 and with the outer end of the adjusting screw formed with a crank handle 19.

A cylinder 20 is welded or otherwise suitably secured in an upright position to the front edge of plates 14 with a compressed air supply line 21 attached to the upper portion of the cylinder and with a piston 22 working in the cylinder and having a piston rod 23 extending downwardly below the cylinder. To the lower end of piston rod 23 is suitably secured a substantially flat inclined foot 24 positioned above a similar foot or stationary clamping plate 25 suitably secured to the lower end of clamp 8.

In the operation of the apparatus, when it is desired to remove a tire casing 26 from a rim 27 after the latter has been removed from a vehicle, the casing is placed between the upper pressure foot 24 and lower clamping foot or plate 25, as shown in Figure 1 of the drawing with the rim 27 resting on a base, not shown, and compressed air is admitted to the upper portion of cylinder 20 behind piston 22, whereby to force the piston and pressure foot 24 downwardly to break or free the tire casing from the rim.

The clamp 8 may be tiltably adjusted to raise or lower the stationary or lower clamping plate 25 in accordance with variations in the size of the tire and consequent differences in distance between the lower side of the tire 26 and the base 6. Such tilting is accomplished by turning adjusting screw 17 which will move the upper end of clamp 8 forwardly or rearwardly on the pivot 13, while the bolt 10 works in slot 11 at the lower end of the clamp.

A tire may be removed from a wheel without removing the wheel from the vehicle, as shown in Figure 4 of the drawing, by removing clamp 8 from the stand 5 and placing the pressure foot 24 and clamping plate 25 at opposite sides of the tire.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having thus described the invention, what is claimed as new is:

A tire changer comprising a C-clamp having a fixed clamping plate at one end, a fluid pressure operated clamping plate at the other end of the clamp, a stand supporting the clamp in an upstanding position and including a pin at the lower portion of the stand adjustably received in a slot in the clamp, a pivot pin carried by the stand and supporting the upper portion of the clamp for rocking movement in a vertical plane, and manually operated rocking means for the clamp.

ERVIN W. OLIVA.

REFERENCES CITED

The following references are of record in the file of this patent:

UNITED STATES PATENTS

| Number | Name | Date |
| --- | --- | --- |
| 1,399,351 | Lee | Dec. 6, 1921 |
| 1,732,081 | Clement | Oct. 15, 1929 |
| 1,966,766 | Raby et al. | July 17, 1934 |
| 2,281,476 | Casey | Apr. 28, 1942 |
| 2,506,007 | Winstead | May 2, 1950 |

FOREIGN PATENTS

| Number | Country | Date |
| --- | --- | --- |
| 623,147 | France | June 16, 1927 |